United States Patent [19]
Ohrn

[11] 3,910,306
[45] Oct. 7, 1975

[54] SAFETY CUT-OFF VALVE

[76] Inventor: Karl Gustav Verner Ohrn, Mynthusgatan 35, S-532 00 Skara, Sweden

[22] Filed: Nov. 26, 1973

[21] Appl. No.: 418,925

[30] Foreign Application Priority Data
Nov. 29, 1972 Sweden .......................... 15572/72

[52] U.S. Cl. ............................................ 137/498
[51] Int. Cl.² ...................................... F16K 17/24
[58] Field of Search .................................... 137/498

[56] References Cited
UNITED STATES PATENTS

| | | | |
|---|---|---|---|
| 2,403,689 | 7/1946 | Sprague | 137/498 |
| 2,411,392 | 11/1946 | Saville | 137/498 |
| 2,821,209 | 1/1958 | Waterman | 137/498 |
| 3,572,845 | 3/1971 | Johannesen | 137/498 X |

Primary Examiner—Henry T. Klinksiek
Attorney, Agent, or Firm—Finnegan, Henderson, Farabow & Garrett

[57] ABSTRACT

A safety cut-off valve for supervising a portion of a pressure medium system and to close a connection between a pressure source and a user in case of conduit or hose breakage in the supervised portion of the system. The cut-off valve comprises a valve body or housing with a central flow channel in which a valve control element is loaded by the fluid flowing in the direction to the user by the pressure in the supervised portion of the system. The valve control element when loaded slides to a position in which it holds a valve member lifted from its seat during normal operation and permitting flow of fluid in the system in both directions. In case of breakage in the supervised portion of the system, the pressure therein falls below normal operating pressure and a spring returns the valve control element to a position in which it leaves the valve member free to be pressed against its seat by the medium or fluid flow in the system, thus shutting the cut-off valve.

11 Claims, 1 Drawing Figure

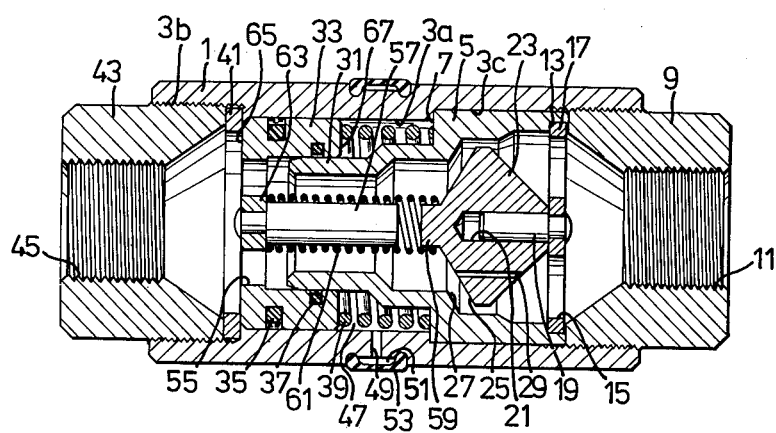

SAFETY CUT-OFF VALVE

The present invention relates to a safety cut-off valve for supervision of a portion of a pressure medium system for connection between a pressure source and user, which is adapted to close automatically if there is a break within the supervised portion of the system, for example conduit or hose breakage.

The intention of the present invention is to achieve a simple and inexpensive valve of this type which by allowing, in the normal operating position, flow of the medium in both directions, can be used in open as well as closed pressure media systems. Thus the valve can be used in hydraulic systems where, for example, a lifted or hanging load loads the pressure medium and breakage in a hose or pipe could have serious consequences due to the load falling. It should also be possible to use the valve in dish washers or washing machines to prevent water damage. The valve can also be used in pneumatic systems, for example in rock drilling machines or the like, where a break in the hose could result in serious injuries.

According to the invention this is achieved with a valve which has a valve housing with a first and a second pressure medium connection, which are connected by means of a flow channel, in which a valve element is disposed, cooperating with a valve seating, for cutting off of the flow channel if there is a drop in pressure in the supervised portion of the system to a level below the lower pressure occurring during operation. The valve element when moving to close the valve moves in the direction towards said first connection connected to the supervised portion of the system and the valve element is lifted from its seating during operation by means of a piston which is pressed against spring force by the pressure in the supervised portion of the system to assume a first position in which it acts on the valve element and which in the absence of this pressure under the effect of the spring force assumes a second position in which it frees the valve element, whereby the valve element, under the influence of the flow of medium is pressed against its seating.

An example of the invention is explained below in more detail with reference to the accompanying drawing, which shows a longitudinal section through a safety cut-off valve according to the invention.

The valve has a cylindrical valve housing 1 with a central stepped bore for enclosing a flow passage, said bore having an intermediate portion 3a with a smaller diameter and two larger diameter outer portions 3b and 3c. An insert sleeve 5 is disposed in the right-hand bore portion 3c, which sleeve has a ring shoulder 7 that is in contact with the shoulder surface formed in the housing because of the different diameters between the bore portions 3a and 3c. The insert 5 is kept in this position with the help of a connecting body 9, screwed into the threaded outer end of the bore 3c, said body having a threaded inner connecting bore 11. In an annular cavity 13 in the right-hand side of the insert 5, as seen in the Figure, there is a plate 17 with a plurality of flow-through openings 15. An axial guide pin 19 is riveted in the center of the plate 17. A valve part of element 23, which is a double-conical body and has an axial bore 21 slides on the guide pin 19. The left-hand cone 25 as seen in the drawing of the valve element 23 is adapted to work in conjunction with a valve seat 27 in the insert 5. The valve element 23 also has a narrow channel in the form of an axial bore 29, which bypasses the valve seat.

A sleeve-shaped plunger 33 is slidable between the bore 3a in the valve housing and an extension 31 of the insert 5 with a smaller diameter. The seals 35 and 37 take care of the seal between the plunger sleeve and the bore portion 3a and the extension 31 respectively. A powerful compression spring 39 is tensioned in between the right-hand end of the plunger 33 and the ring shoulder 7 of the insert 5. Said spring, in the absence of pressure, holds the plunger sleeve 33 in contact with a stop ring 41, which is secured in the bore 3b against the shoulder formed by the reduced bore portion 3a by means of a connecting body 43 screwed into a threaded part of the housing 1. The connecting body 43 is provided with a threaded inner bore 45,. The space 47 formed between the bore portion 3a, the insert 5 and the plunger sleeve 33 is vented to atmospheric pressure with the help of a bore 49, which leads to an annular groove 51 on the outside of the valve housing. Said groove is tightly covered by a soft breathing membrane 53, which prevents dirt and moisture from entering the space 47 when the plunger 33 moves. The lefthand end of the plunger 33, which has a number of large openings 55 for flow of the medium, has a stop pin riveted in the center, which extends axially towards the valve element 23. Right in front of the stop pin or valve engaging element 57 the valve element 23 is provided with a guide pin or projection 59. A light compression spring 61 which in the pressureless state keeps the valve element 23 from the seating 27, is tensioned in between the valve element and a seating 63 on the inside of the end of the plunger 33 around the stop pin 57. The stop pin 57 and the projection 59 of the valve element 23 form interior guides for the spring 61.

In the absence of pressure the parts of the cut-off valve assume the positions shown in the drawing. The connecting body 43 of the valve is to be connected to that portion of the pressure medium system which is to be supervised and shut off if there is, for example, a hose break in the same. If the cut-off valve is to be used for a hydraulic system, e.g. a hydraulic crane or loading machine with a load-carrying hydraulic cylinder, the right-hand connecting body 9 of the cut-off valve is connected directly to said cylinder and the connecting body 43 to the conduit and hose system to be supervised which leads to the cylinder. Said system is connected to the hydraulic pump via operating valves. When the system is in operation there is a certain prevailing pressure in the system which acts on the left-hand end surface 65 on the plunger sleeve 33. In addition to atmospheric pressure only the spring 39 acts on the righthand end surface 67 of the plunger 33. Thus under the effect of the media pressure the plunger 33 will be held in a first position to the right in the bore portion 3a so that the valve engaging element or stop pin 57 lies against the guide pin or projection 59 and holds the part of valve element 23 from its seat 27. The area of the end surface 65 and the force of the spring 39 are adjusted so that the plunger 33 is kept in its right-hand position even when the flow of medium is to the left from the connection 9 to the connection 43 due to the counter-pressure occurring in the conduit system and valves of the hydrualic system.

However, should the pressure in this supervised portion of the set-up fall below said counter-pressure, which occurs for example when a hose breaks, the spring 39 will push the plunger 33 to its left-hand end position in contact with the stop ring 41. The valve engaging element or stop pin 57 has freed the valve element 23, which under the effect of the flowing medium is pressed against its seat 27 thereby closing the flow passage through the valve.

If the valve is used in an open system, for example in supplying compressed air to a rock drill, the connection 9 is connected directly to the air compressor or a distribution valve while the connecting body 43 is connected to the conduit or hose system to be supervised which feeds compressed air to the drilling machine. In normal operation there is thus a counter pressure in the connection 43 which keeps the plunger 33 pushed in and the valve part or element 23 raised from the valve seat. If a hose breaks, this counter pressure ceases and the plunger 33, as was described above, is pushed to the left so that the valve part or element 23 under the effect of the flow of air is free to be pressed against its valve seat 27 and closes the flow passage through the valve.

When a compressed air set-up of this type is to be put into operation the left-hand connection 43 is pressureless from the beginning. The weaker spring 61 however, holds the valve part or element 23 away from the valve seat 27 so that the initial slow filling of the system can be done. If the filling is done too quickly the valve element 23 will be pressed so as to close against its seat 27, preventing further filling of the system. However, the bore 29 causes pressure equalization to occur slowly between both sides of the valve element 23 so that the system can be filled in spite of this.

What I claim is:

1. A safety cut-off valve adapted to close automatically in case of loss of pressure within a supervised portion of a closed system making use of a pressure fluid to actuate a motor, the cut-off valve being connected between a source of pressure fluid and the motor and being adapted to close automatically in case of a breakage within the supervised portion of the system comprising a valve housing having one connection to the supervised portion of the system and a second connection to receive the fluid under pressure, said connections being interconnected through the valve housing by a normally open flow passage, a valve seat in the flow passage, a valve part in the flow passage between the seat and the second connection which valve part is urged by the flow of fluid under pressure through the passage toward the valve seat; means to hold said valve part off of said seat during normal operation, said means including a first spring and a plunger member in the flow passage, said plunger having one end facing said one connection, said one end of said plunger member being exposed to the pressure fluid in the passage and supervised portion of the system to be moved under the influence of the normal operating pressure thereof to a first position, said plunger member including a valve engaging element movable therewith for positively holding the valve part away from its seat when said plunger member is in said first position; a second spring for urging the plunger member to move in a direction opposite to the movement that takes place under normal operation, said second spring effecting movement of the plunger member away from said first position to a second position when a subnormal pressure prevails in said supervised portion of the system and the passageway at said first connection, and said valve engaging element being moved with the plunger member as it moves to said second position to release its hold on the valve part to allow the valve part to seal against its seat under the urging of the flow of fluid under pressure through said second connection into the passageway.

2. A structure as in claim 1, wherein the plunger member takes the form of a first sleeve slidably mounted in the valve housing, said housing having a bored seat therein to receive said sleeve, means to seal the sleeve within the bore in the housing as it slides, said flow passage extending through the interior of the sleeve, one end of the sleeve constituting said one end of the plunger exposed to the pressure fluid, a second sleeve concentrically carried within the first sleeve and having a shoulder fixed to said housing, the opposite end of said first sleeve from said one end moving in a space which is not subjected to the pressure fluid, said space being formed between said opposite end of the sleeve within said housing and said second fixed sleeve, a sliding seal disposed between said two concentric sleeves, and said second spring being a compression spring in said space positioned between said opposite end of the first sleeve and said shoulder.

3. A structure as in claim 2, wherein said one end of the first sleeve supports a central pin disposed lengthwise within the flow passage, said pin constituting said element that engages the valve part to positively hold it off of its seat when the first sleeve is in said first position and is moved therewith to release its hold on the valve part when said first sleeve moves to said second position.

4. A structure as in claim 2, wherein said valve seat is integral with said second sleeve.

5. A structure as in claim 2, wherein said space in said housing formed between said opposite end of the sleeve and said second fixed sleeve is vented to the outside of the housing through aperture means, and flexible membrane means are associated with said aperture means to permit atmospheric pressure to prevail at all times in said space while sealing out the intrusion of dirt or the like into said space.

6. A structure as in claim 5, wherein a channel surrounds the outside of said aperture means for venting said space and said membrane is carried in said channel.

7. A structure as in claim 1, wherein said valve part is a body that is conically shaped on both sides, said body having a slide bearing bored centrally in the conical side facing away from said valve seat and a guide pin fixedly carried by said housing, said guide pin cooperating with said bearing to guide said valve part onto said seat.

8. A structure as in claim 7, wherein said housing includes a plate fixed thereto disposed transversely of the flow passage, said plate having flow-through openings therein to permit fluid to flow therethrough, and said guide pin being fixed to said plate.

9. A structure as in claim 1, wherein said valve part is urged away from said seat by said first spring, said first spring being weak in comparison with said second spring that urges said plunger member to said second position.

10. A structure as in claim 9, wherein said valve part includes a first spring guide on the side of said valve part that faces said seat, and said valve engaging member takes the form of a stop pin in line with said spring guide, said spring guide and said stop pin together constituting an interior support means for said first weaker spring.

11. A structure as in claim 1, wherein the valve part has a small axial bypass therethrough to permit gradual equalization of the fluid pressure to take place on the opposite sides of the valve part after the valve part has been seated.

* * * * *